Sept. 20, 1960 P. M. PAPPAS 2,953,097
PORTABLE MOTOR DRIVEN FILTER PUMP
Filed Jan. 17, 1958
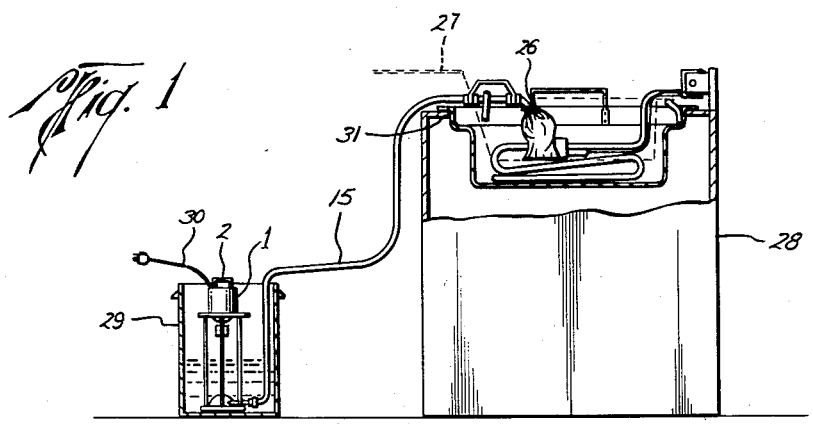
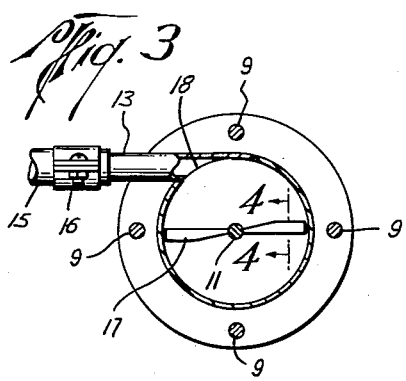
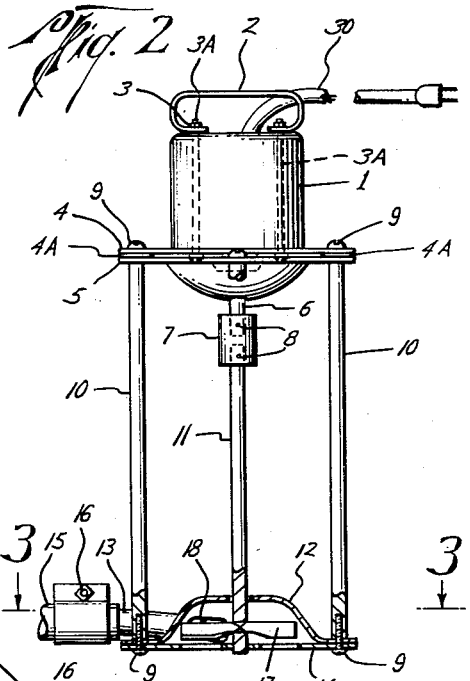
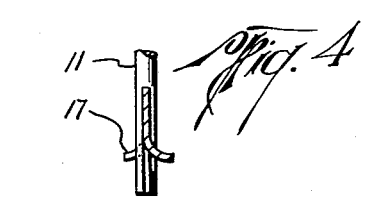
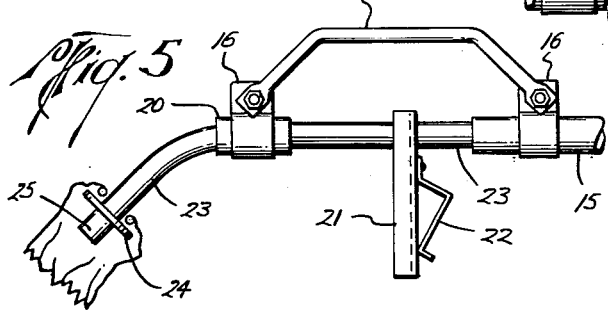
Phillip M. Pappas
INVENTOR.
BY
ATTORNEYS.

2,953,097

PORTABLE MOTOR DRIVEN FILTER PUMP

Phillip M. Pappas, Box 756, Houston, Tex.

Filed Jan. 17, 1958, Ser. No. 709,596

1 Claim. (Cl. 103—87)

This invention relates to a portable motor driven filter pump.

In the production of fried foods it is necessary that the cooking oil or compound be filtered or strained frequently, at least once daily. This filtering of the cooking oil or fat is even more necessary where commercial fryers employ the flat bottom lift-out type of fat vessel for this type of frying equipment has no provision for preventing sediment of the food being fried from recirculating and carbonizing in the frying fat thus causing premature breakdown and depositing objectionable black specks on the food being fried.

An object of the invention is to provide means for frequently filtering and straining cooking oil or compound used in a deep fat fryer.

Another object of the invention is to remove mess and hazard from the task of emptying, refilling and filtering oil or fat used in a deep fat fryer. With my new portable power filter pump, this task is accomplished quickly and easily with no lifting of the hot fat or danger of being burned from spilling said hot fat.

A further object of the invention is that the sanitary design provides easy cleaning and sanitation for the pump unit.

With the foregoing and other objects in view, my invention comprises certain novel constructions, combinations, and arrangements of parts as will be hereinafter fully described, illustrated in the accompanying drawings, and more particularly pointed out in the appended claim.

In the drawings:

Figure 1 is a view partly in vertical section and partly in side elevation of a lift-out pot of a deep fat fryer, showing the pump unit pumping the fat back into the fat vessel and filtering the same through a cloth bag placed in the fry basket. To outline the usual practice, the pump will be first placed in the fry pot of the fryer with the discharge into a standard fat can to pump the fat out of the fryer. The lift-out pot is then taken to the sink to be washed and the pump is placed in the fat can and the discharge hose placed in the basket of the fryer and with the filter sack tied to the end of the discharge tube the fat is pumped up into the cleaned fry pot.

Figure 2 is a vertical view partly in section showing the pump unit.

Figure 3 is a view taken on line 3—3 of Figure 2 and looking in the direction of the arrows.

Figure 4 is a sectional view taken on line 4—4 of Figure 3 and looking in the direction of the arrows.

Figure 5 is a view in side elevation of the discharge outlet showing the handle clip arrangement and bag attachment washer.

Referring to the drawings, Figure 1 shows a fryer 28 of the lift-out pot type which is fitted with pot 31 and basket 27. The pump unit is shown in can 29 which happens to be a standard fifty pound fat can of the type restaurants receive their fat in. The liquefied fat is shown in the fat can 29 by means of dotted lines. The standard electric cord and plug unit 30 brings current to the motor 1, pumping the fat up through hose 15 and out through flannel cloth bag 26 thus filtering the fat and pumping it back up into the fryer. As previously mentioned, the fat was pumped out of the pot and into the can 29 with the pump placed in the fry pot and the fry pot 31 was cleaned and replaced in the fryer, so after pumping and filtering the fat back up into the pot 31 the fryer is ready for another day's operation.

Figure 2 shows the pump construction. The standard fractional horsepower motor 1 has a sheet metal pump carrying handle 2 which is attached to the motor by means of nuts 3 holding same to motor studs 3A. The motor attachment bracket 4 is a flat steel stamping which is fixedly attached to the motor by studs 3A. The motor shaft 6 extends into high temperature plastic such as nylon or Teflon coupling 7 to insulate the motor shaft from 350° fat temperature. The coupling 7 is attached to the motor shaft 6 and the pump shaft 11 by means of removable cotter pins 8 which pass through the motor shaft and pump shaft respectively. The motor housing splash shield 5 with dome-like cup portion extending downward provides clearance for motor studs 3A shown by dotted lines and the motor shaft bearing protrusion. This splash shield 5 is attached to the upper ends of the tie rods 10 by means of bolts 9 which are threaded into the tie rods as shown in the cutaway section at the bottom of Figure 2. High temperature plastic washers 4A are located between motor brackets 4 and motor housing splash shield 5 to isolate and insulate motor 1 and pump carrying handle 2 from heat travelling up tie rods 10 from the 350° fat. The pump housing 12 consists of a stamping with dome-like cup extending upward and this stamping along with bottom plate 14 is attached to the lower ends of tie rods 10 by means of bolts 9. The discharge tube 13 is welded to the discharge outlet hole in the dome-like cup 18 and the pump housing is fitted with cover 14 which has a plurality of narrow slots as shown in the cutaway to permit entry of fat being pumped with the slots so sized as to prevent large particles that might clog the unit from entering the pump housing. The bolts 9 also serve to maintain a small space between bottom plate 14 and the fat vessel so that fat may be pumped out of a vessel to within one-eighth of an inch of the vessel bottom. It will also be seen that in the dome-like cup portion of stamping 12 there is a clearance hole in the center for pump shaft 11 so that fat may enter the pump housing from above when the level is high, yet clearance is small enough to prevent entry of large food particles that might clog the unit. The flexible high temperature silicone rubber tube 15 is attached to the pump outlet 13 by means of strap 16. The corrosion-resistant sheet steel impeller 17 is scoop shaped toward its outer bottom edges to pick up fat even when the level is below pump outlet hole 18. The flexible power cord and plug unit 30 is made preferably of oil resistant rubber or neoprene.

Figure 3 which is taken along line 3—3 of Figure 2 shows the latterly mentioned parts looking down on them.

Figure 4 which is taken along line 4—4 of Figure 3 shows the mounting of the pump impeller 17 in the slotted bottom portion of the pump shaft 11 and further shows the scoop shaped outer end of the impeller blade so that fat can be picked up and pumped out to a very low level.

Figure 5 shows the pump discharge handle assembly. The flexible high temperature silicone rubber hose 15 is attached to tube 23 by means of bolted straps 16. Handle 19 consists of steel rod with flattened ends which is held in place by the same strap 16 at the hose outlet end and further another piece of hose 20 is utilized with another strap 16 to hold the other end of handle 19. It will be seen that the hose piece 20 and the hose end 15 help to insulate handle 19 from direct contact with tube 23 which becomes very hot when pumping and filtering 350° fat. This eliminates danger of the operator from becoming burned when holding handle 19. Near the end of tube 23 a washer 24 is placed to said tube so that a flannel filter sack which is equipped with draw string at one end can be tied around tube 23 just above the washer 24 so that the filter sack will stay in position while the fat is being pumped and filtered. The attachment channel 21 is attached to tube 23 underneath the handle 19 and spring steel clip 22 is attached to handle 21. This clip 22 allows the handle assembly to be attached to a standard fat can or to a fry basket so that the operator need not hold the handle while fat is being pumped or filtered.

It will be noted that all parts are exposed or accessible for easy wiping and cleaning. It will also be noted that motor splash shield 5 and pump housing 12 are corrosion resistant sheet steel stampings made with one die and with upper motor splash shield 5 shallow drawn with dome extending downward and lower pump housing 12 deep drawn with dome extending upward. These together with tie rods 10 elevate the motor, cord and coupling high enough to permit placement in a deep vessel with a high fat level. Also, the utilization of two practically identical domed stampings with four identical tie rods provides easy cleaned sanitary construction and also low manufacture cost, as well as simple assembly or disassembly with only a screwdriver required. The use of one-piece corrosion resistant smooth surface stampings without corners or crevices and the round tie rods provides utmost sanitation and ease of cleaning which is very important in food handling. The high temperature plastic coupling 7 and two plastic washers 4A provide simple inexpensive means of isolating and insulating motor 1 and carrying handle 2 from 350° fat heat conducted by tie rods 10 and pump shaft 11.

While I have described the preferred embodiments of my invention and illustrated the same in the accompanying drawings, certain minor changes or alterations may appear to one skilled in the art to which this invention relates during the extensive manufacture of the same, and I, therefore, reserve the right to make such alterations or changes as shall fairly fall within the scope of the appended claim.

What I claim is:

A portable pump comprising an upwardly domed circular pump housing, a radially extending outlet conduit integrally secured to said housing, a plurality of spaced apart parallel upright tie rods having their lower ends supported on said housing, a slotted bottom cover engaged under said housing, a plurality of bolts extending through said cover in said housing threaded into the lower ends of said tie rods securing said cover and said tie rods to said housing, a generally circular motor support bracket supported on the upper ends of said tie rods, a motor carried by said motor support bracket, a drive shaft depending from said motor parallel to said tie rods and having its lower end terminating within said pump housing, a rotary impeller carried on the lower end of said drive shaft, said impeller being provided with a plurality of radially extending blades, each of said blades having the leading edges thereof curved downwardly and forwardly in a direction of rotation to provide a scoop action, the bottom of each blade being straight and positioned closely adjacent said slotted bottom cover permitting said impeller blade to pick up material to be pumped from a very low level, a flexible conduit extending from said pump, a nozzle attached to said conduit, and means secured to said nozzle for securing the same to a receptacle.

References Cited in the file of this patent

UNITED STATES PATENTS

| | | |
|---|---|---|
| 829,017 | Jordan | Aug. 21, 1906 |
| 1,767,535 | Lannert et al. | June 24, 1930 |
| 2,006,727 | Ardrey | July 2, 1935 |
| 2,233,825 | Walsh et al. | Mar. 4, 1941 |
| 2,432,073 | Hargen | Dec. 2, 1947 |
| 2,459,312 | Essick | Jan. 18, 1949 |
| 2,468,704 | Pippin | Apr. 26, 1949 |
| 2,537,965 | Cantin | Jan. 16, 1951 |
| 2,545,824 | McDonald | Mar. 20, 1951 |